Patented Jan. 14, 1936

2,027,972

UNITED STATES PATENT OFFICE 2,027,972

INTERNAL COMBUSTION ENGINE

John Haller and Leslie A. Low, Detroit, Mich.

Application July 24, 1933, Serial No. 681,843

4 Claims. (Cl. 123—16)

This invention relates to internal combustion engines and the object of the invention is to provide a rotary internal combustion engine in which the intake, compression, combustion and exhaust operations are completed in one revolution of the rotor.

Another object of the invention is to provide a rotary internal combustion engine utilizing a series of blades between which combustion takes place, the blades moving with the rotor and traveling successively to the intake, compression, combustion and the exhaust positions.

A further object of the invention is to provide a rotary engine in which suction is produced at the intake position to draw air into the engine which is compressed as it reaches the firing point and after firing, expansion takes place to drive the rotor and at the completion of the cycle the burned gases are completely scavenged from the engine.

Another object of the invention is to provide a rotary internal combustion engine in which the side pressures on the blades are reduced as well as the frictional pressure caused by the contact of the blade edges with the rotor.

A further object of the invention is to provide a rotary internal combustion engine which may be used either as a gasoline engine or as an engine in which the fuel is injected into the compression chamber.

These objects and the several novel features of the invention are hereinafter more fully described and claimed and the preferred form of construction by which these objects are attained is shown in the accompanying drawings in which—

Figure 1:
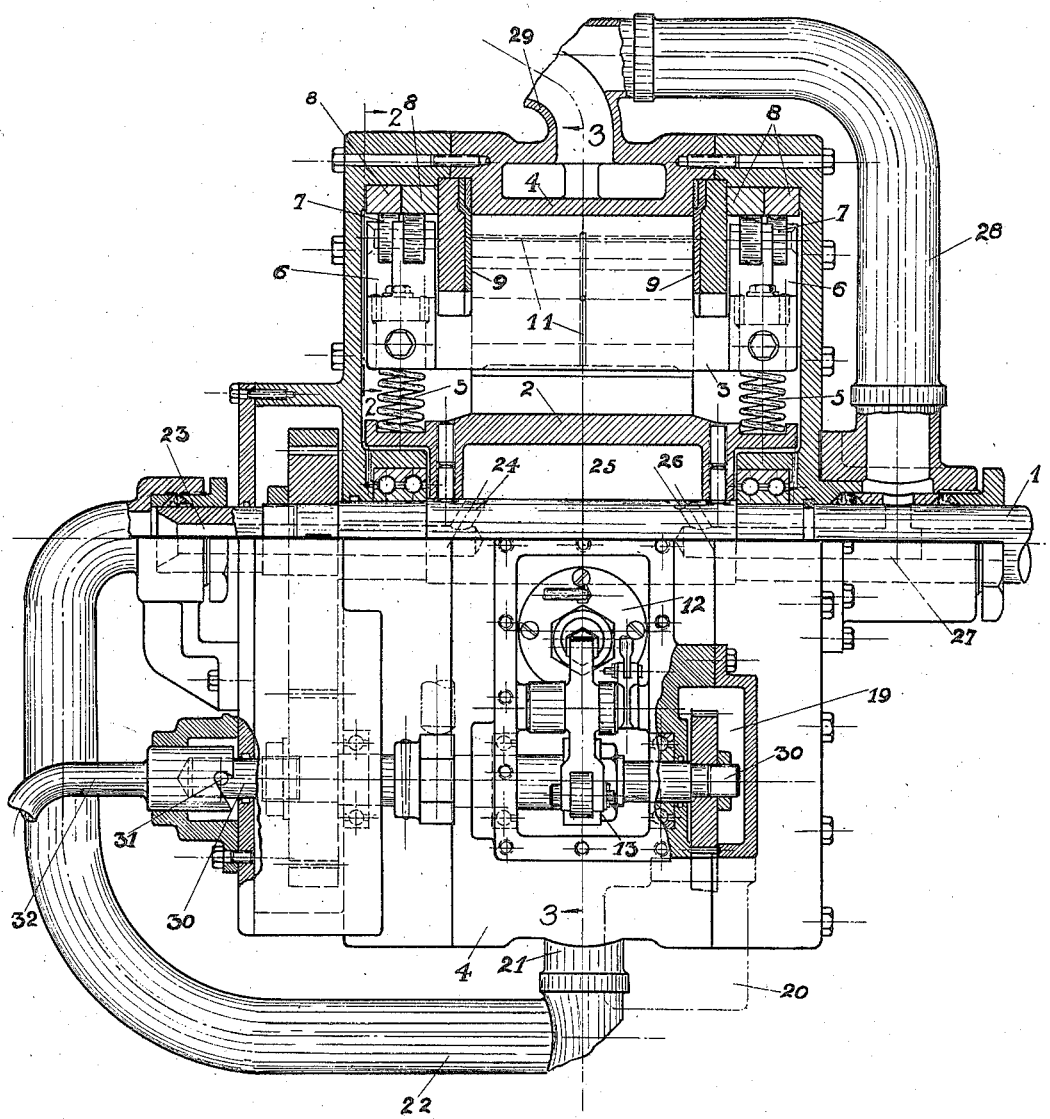
Fig. 1 is a side view of the engine partially in section to show the construction.
Figure 2:
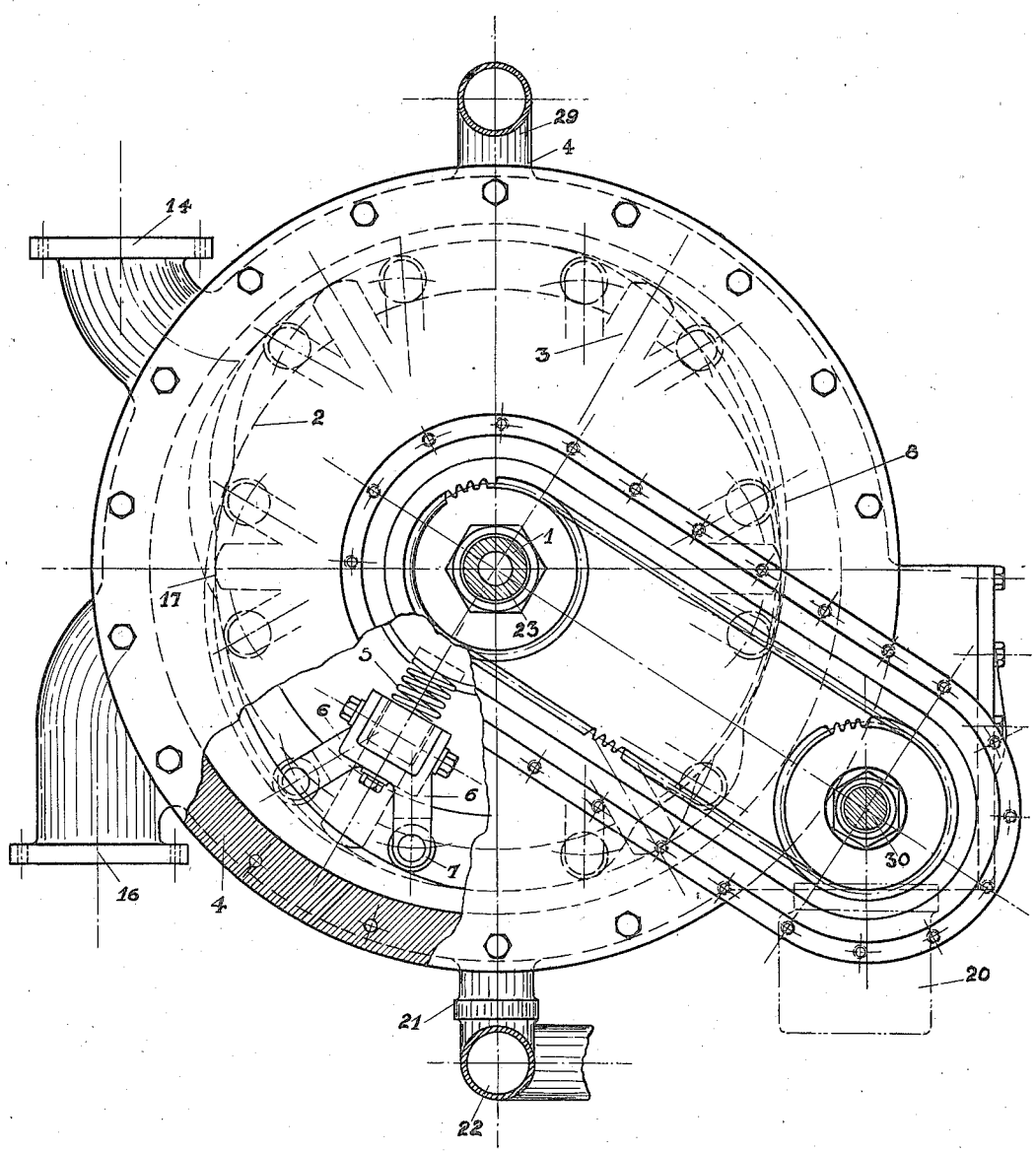
Fig. 2 is an end view of the engine taken from the left of Fig. 1 and partially broken away on the line 2—2 shown in Fig. 1 to show the blade support.
Figure 3:
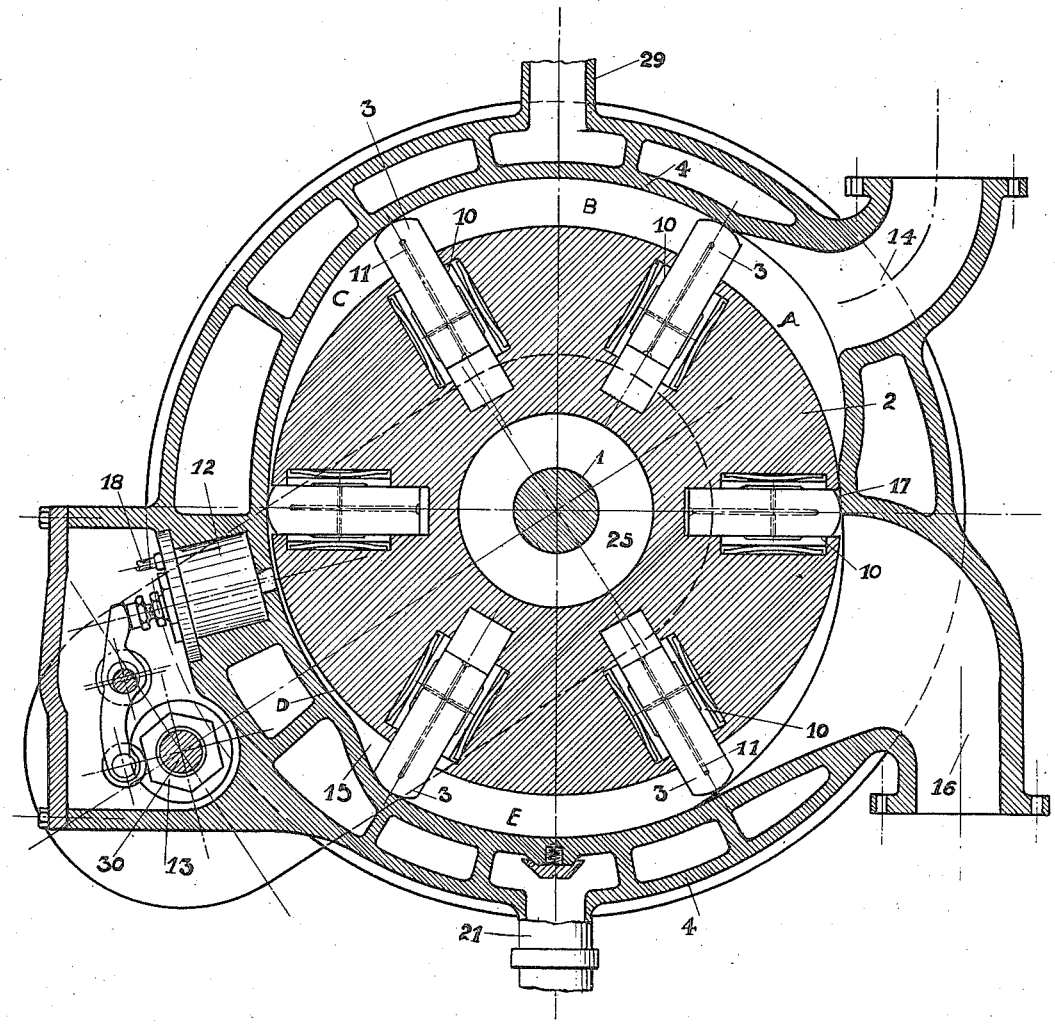
Fig. 3 is a section taken on line 3—3 of Fig. 1.

As shown in Figs. 1, 2 and 3 the engine comprises a shaft 1 provided with a slotted rotor 2 firmly secured thereto. A number of blades 3 are mounted in the slots of the rotor and are movable toward or away from the center of the rotor. The rotor revolves in a specially designed casing 4 which forms the stator and the blades 3 ride in continuous contact with the inner face of the stator by means of the coiled springs 5 shown in Fig. 1 which are supported in sockets provided therefor in the rotor and normally press the blades outwardly. In order to limit the pressure of the blades against the casing and reduce the friction at this point the blades are each provided with Y shaped arms 6 at each end, as shown in Figs. 1 and 2, and a roller 7 is supported in the outer end of each arm 6 and the rollers ride on two separate cam races 8 which are so shaped as to cause the edges of the blade to follow the inner face of the stator 4. These rollers not only reduce the friction between the blades and the rotor but also guide the blades so that side pressures against the blades do not cause them to bind in the blade slot.

As shown in Fig. 1, the edges of the blade are kept gas tight by means of spring metal side plates 9 which are held in contact with the edges of the blades by the inherent spring in the metal and the sides of the rotor are also kept gas tight by these side plates 9. The opposite side faces of the blades are kept gas tight by means of the spring pressed plates or shoes 10 inserted in the slots in the rotor at each side of the respective blade slot.

Lubrication is accomplished by introducing oil into the annular Y-arm chambers 45 and these Y-arms are moving in an oil bath and splash oil to lubricate the parts while the oil is also fed up through the blade conduits 11 which open out through the blades on both sides to lubricate the bearing surfaces of the spring metal plates 9.

In the form shown in Figs. 1, 2 and 3 a special injector 12 is provided in the casing at a point where high compression will occur. This injector is operated by a cam 13 having the same number of points as there are blades in the rotor and timed by a chain drive 46 shown in Fig. 2 to inject the desired amount of fuel at the correct time. This injector may be connected by a fuel line 18, shown in Fig. 3, to a suitable source of liquid fuel supply. Any of the usual types of injectors may be utilized at this point, if desired, the object being to inject liquid fuel into the compressed air in the chamber D after each blade passes the injector 12.

The cycle starts by air being drawn through a suitable control valve (not here shown) through the inlet 14 of the outer casing or stator. As one of the rotor blades moves past the inlet and away from it a quantity of air will be drawn into the space A between two of the blades. This air is drawn inwardly due to the fact that one of the blades is moving outwardly to increase the cubical content of the chamber A. The inlet will be closed by the following blade and the air charge in the chamber A will then be carried between the two blades in the chamber B from whence it travels to a position shown as chamber C where compression of the air begins to take place. At a point in the chamber D just before maximum pressure occurs the blade will pass the inlet from the injector 12. Immediately after the blade passes this inlet the fuel is injected into the compressed air and will be agitated by the forward movement of the air and further compression until maximum compression takes place, at which time, combustion will occur in the chamber D. At a point just beyond maximum compression position, an expansion step 15 is formed in the stator at which point the blade will move outwardly to maximum extension presenting the greatest possible area of the blade to the explosion gases while the following blade is still at minimum extension. The expanding gases will carry the rotor through the chamber E to a point where the exhaust port 16 will be opened by the blade passing thereby, at which time, the following blade will be in the firing position. In passing the exhaust port 16 the blade recedes flush with the rotor and the stator also curves close to the rotor at 17 so that no burned gases can pass beyond the exhaust port and consequently the burned gases are completely scavenged from the engine.

As will be noted from Fig. 1 the water cooling system for the engine is partially shown and includes a pump 19 which supplies water through a member 20 to the conduits 21 and 22. The conduit 21 leads directly to the water jacket of the stator while the pipe 22 leads to the end of the shaft 1 to which it is connected by a packing gland 47. This shaft is drilled out at 23 to allow the water to flow therethrough and through the channel 24 into the chamber 25 provided in the center of the rotor as shown in Figs. 1 and 3. A return conduit 26 and 27 leads to the conduit 28 through which the water discharges and a conduit 29 is also provided which is connected to the water jacket of the rotor and these conduits 28 and 29 preferably lead to a radiator (not here shown) and the return conduit from the radiator leads back to the pump 19. The shaft 30, shown in Figs. 1 and 2, is chain driven from the shaft 1 and this shaft 30, as shown in Fig. 3, is provided with a cam 13 for operating the injector. This shaft is provided with a pin 31 in the end so that a starting crank 32 may be applied to the shaft and utilized in starting the engine.

Figure 4:
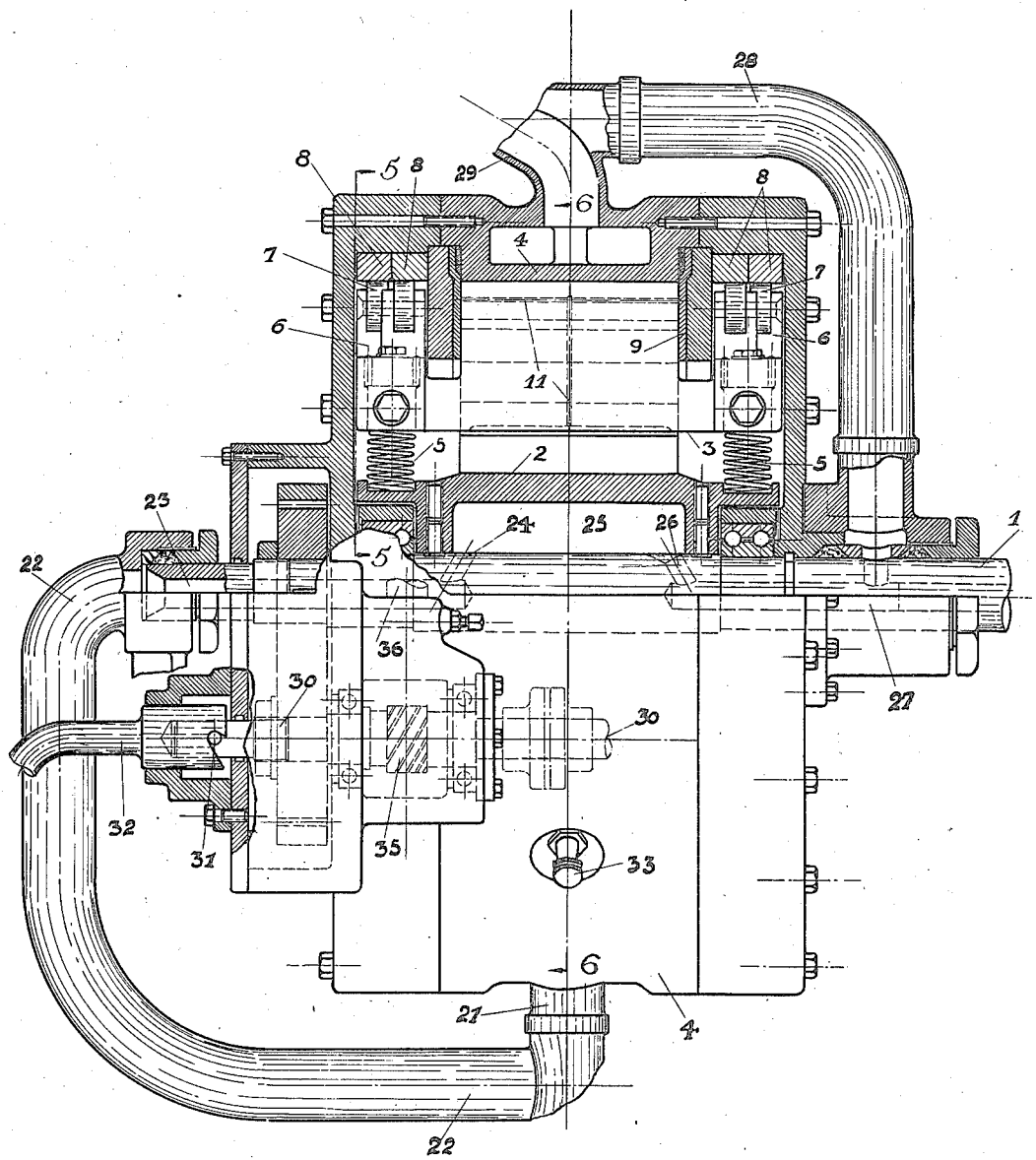
Fig. 4 is a view similar to Fig. 1 showing the engine arranged for use as a gasoline engine.
Figure 5:
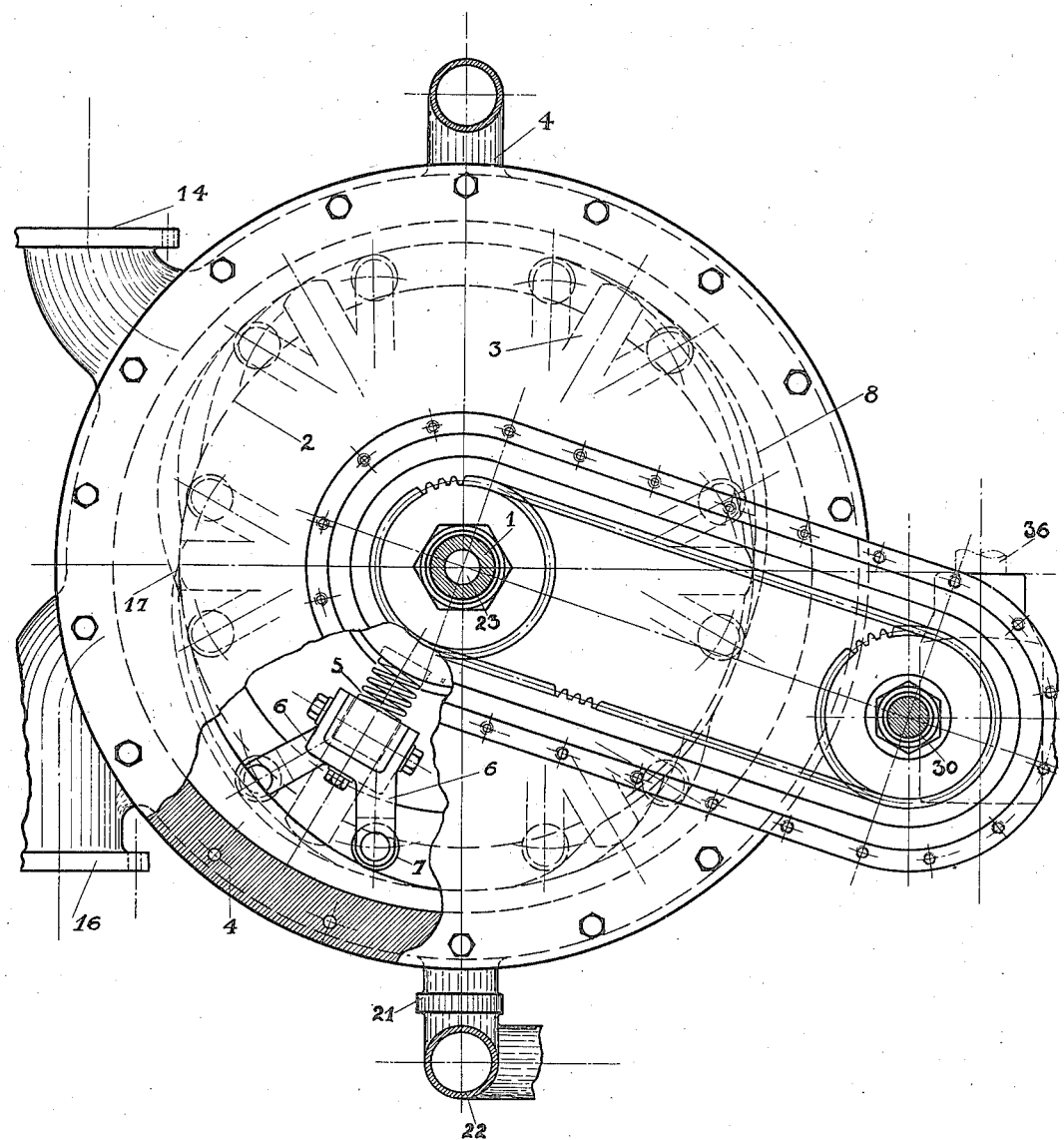
Fig. 5 is a view similar to Fig. 2 showing the engine arranged for use with gasoline and also showing the blade supports taken on line 5—5 of Fig. 4.
Figure 6:
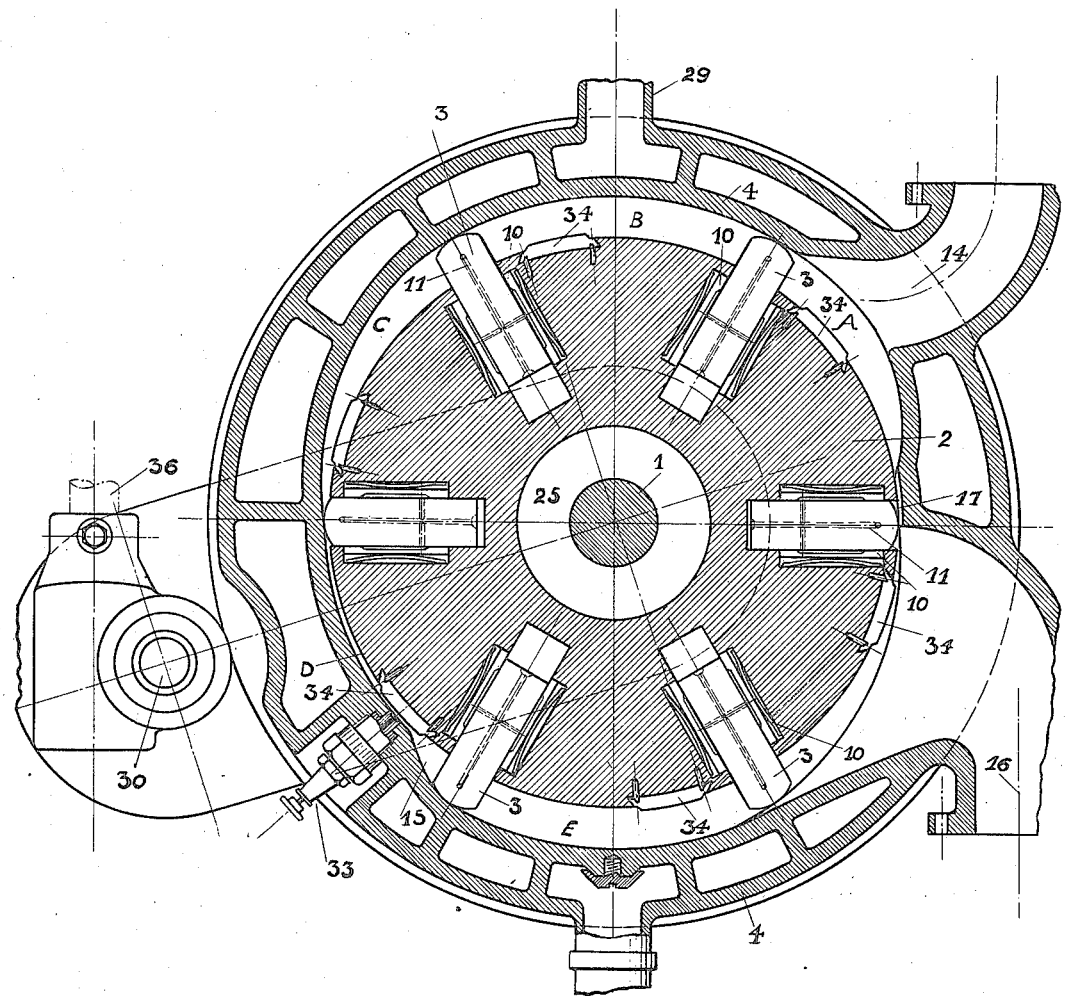
Fig. 6 is a section taken on line 6—6 of Fig. 4.

In Figs. 4, 5 and 6 the engine is shown arranged for use as a gasoline engine. In this case, a carbureter (not here shown) is connected to the intake conduit 14 and a spark plug 33 is provided for firing the charge as shown in Fig. 6. This spark plug is provided with a central electrode carried in a porcelain insulator 48 and the electrode terminates flush with the inner wall of the stator. In Fig. 6 the rotation of the rotor is counter-clockwise, the same as Fig. 3, and behind each blade an electrode 34 is provided which is preferably made of a heat resistant alloy and is grounded to the rotor.

The shaft 30 in this case is provided with a helical or worm gear 35 for driving the shaft 36 to which a distributor is connected though not here shown. The distributor may be connected directly with the central electrode of the spark plug 33 and is arranged so that electric current flows through the central electrode at the time that the rotor electrode 34 is passing the spark plug. In this arrangement the charge is drawn through the intake conduit 14 into the chamber A, is then carried through the chamber B and begins compression in the chamber C. Maximum compression is reached in the chamber D and the charge is fired just before the blade 3 reaches its maximum extension and during the time that the rotor electrode passes the spark plug. The gases expand in the chamber E and are then discharged through the exhaust port 16 and the gases are completely scavenged by the time that the blades pass the point 17. In all other respects this engine is similar to that shown in Figs. 1, 2 and 3 and the shaft 30 is extended to connect to a water pump which is not here shown but is substantially the same as the water pump 19 shown in Fig. 1. In both cases the spring pressed shoes 10 ride against the opposite faces of each blade and prevent excessive oil leakage by centrifugal force and also prevent loss of compression about the blades.

From the foregoing description it becomes evident that the device is very simple and efficient in operation, will not easily get out of order, provides suction for drawing in the charge and compresses the charge and fires it and completely discharges the burned gases through the exhaust port so that the engine is completely scavenged.

Having thus fully described our invention, its utility and mode of operation, what we claim and desire to secure by Letters Patent of the United States is—

1. In a rotary internal combustion engine, a stator, a rotor, a series of blades carried by the rotor, a Y-haped arm at each end of each blade, the ends of each Y-arm extending on opposite sides of the plane of the blade, a roller rotatably mounted in each end of each arm, an annular race for each roller mounted in the stator and so formed that the rollers in riding on the races will guide the blades in contact with the inner face of the stator.

2. In a rotary internal combustion engine, a stator, a rotor, a series of blades carried by the rotor, a pair of guide arms fixedly connected with each end of each blade, a pair of races at each end of each blade, a roller rotatably mounted in the end of each guide arm and riding on its respective race, the arrangement being such that during rotation of the rotor the rollers on the arms traverse the respective races to limit the upper edge of the blade to travel in contact with the inner face of the stator.

3. In a rotary internal combustion engine, a stator, a rotor, a series of blades carried by the rotor, a pair of guide arms secured to each end of each blade and extending on opposite sides of the plane of the blade, a roller rotatably mounted in the end of each arm, an annular race for each roller mounted in the stator, a series of springs urging the blades outwardly and maintaining the rollers in contact with the respective races, the arrangement being such that the rollers in traversing the races guide the blades with the upper edges in contact with the inner face of the stator.

4. In a rotary internal combustion engine, a stator, a rotor, a series of blades carried by the rotor, a pair of guide arms secured to each end of each blade and extending at an angle on opposite sides of the plane of the blade, a roller rotatably mounted in the end of each arm, an annular race for each roller mounted in the stator, the rollers riding on the races to guide the blades edges in contact with the inner face of the stator.

JOHN HALLER.
LESLIE A. LOW.